(12) United States Patent
Whittle

(10) Patent No.: US 11,913,510 B2
(45) Date of Patent: Feb. 27, 2024

(54) ROTOR CLIP APPARATUS AND SYSTEMS

(71) Applicant: GOODRICH CORPORATION, Charlotte, NC (US)

(72) Inventor: Scott Whittle, Springboro, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 232 days.

(21) Appl. No.: 17/486,427

(22) Filed: Sep. 27, 2021

(65) Prior Publication Data

US 2023/0096318 A1  Mar. 30, 2023

(51) Int. Cl.
| | |
|---|---|
| F16D 66/02 | (2006.01) |
| F16D 55/36 | (2006.01) |
| F16D 65/12 | (2006.01) |
| F16D 69/00 | (2006.01) |

(52) U.S. Cl.
CPC ............. *F16D 66/02* (2013.01); *F16D 55/36* (2013.01); *F16D 65/126* (2013.01); *F16D 2069/004* (2013.01)

(58) Field of Classification Search
CPC .. F16D 66/02; F16D 2069/004; F16D 66/026; F16D 66/022; F16D 25/126; F16D 13/64; F16D 13/648; F16D 13/68; F16D 55/36; F16D 65/12
See application file for complete search history.

(56) References Cited

U.S. PATENT DOCUMENTS

| | | | | |
|---|---|---|---|---|
| 3,754,624 A | * | 8/1973 | Eldred | ................... F16D 65/84 |
| | | | | 188/264 G |
| 3,915,272 A | * | 10/1975 | Maurice | ................. F16D 13/52 |
| | | | | 188/71.5 |
| 4,784,246 A | | 11/1988 | Edmisten | |
| 4,863,001 A | | 9/1989 | Edmisten | |
| 5,549,181 A | * | 8/1996 | Evans | ................... F16D 65/097 |
| | | | | 188/73.38 |
| 6,843,350 B2 | * | 1/2005 | Larkin | .................... F16D 65/12 |
| | | | | 188/218 XL |
| 7,303,055 B2 | * | 12/2007 | Eckert | ..................... F16D 55/36 |
| | | | | 188/218 XL |
| 7,410,036 B2 | * | 8/2008 | Wimmer | ................. F16D 65/12 |
| | | | | 188/218 XL |
| 7,802,758 B2 | | 9/2010 | Cress et al. | |

(Continued)

FOREIGN PATENT DOCUMENTS

CN    200961652    10/2007

OTHER PUBLICATIONS

FR 3004500 A1 (Year: 2014).*

(Continued)

*Primary Examiner* — Robert A. Siconolfi
*Assistant Examiner* — Mahbubur Rashid
(74) *Attorney, Agent, or Firm* — SNELL & WILMER L.L.P.

(57) ABSTRACT

A half cap wear clip may comprise: a wear face configured to interface with a torque bar; a first flange disposed on a first side of the wear face and a second flange disposed on a second side of the wear face, the second side opposite the first side; and a deformable feature disposed on a first end of the first flange and the second flange and the wear face, the deformable feature configured to permanently deform a first distance in response to a load on the wear face exceeding a load threshold.

13 Claims, 4 Drawing Sheets

(56) References Cited

U.S. PATENT DOCUMENTS

2016/0279710 A1\* 9/2016 Whittle .................. F16D 55/36
2019/0048949 A1 2/2019 Stevenson

OTHER PUBLICATIONS

JP H0247437 U (Year: 1990).\*
WO 2013011490 A1 (Year: 2013).\*
European Patent Office, European Search Report dated Feb. 16, 2023 in Application No. 22196714.4.

\* cited by examiner

ROTOR CLIP APPARATUS AND SYSTEMS

FIELD OF THE DISCLOSURE

The present disclosure relates to aircraft brake components and, more particularly, to aircraft brake assemblies with wear clips with a deformable feature.

BACKGROUND OF THE DISCLOSURE

Conventional aircraft brake assemblies comprise rotating and stationary discs which stop the aircraft when compressed together. Typically, sacrificial wear clips are coupled to brake disc lugs to provide strength and protect the rotor discs from excessive wear. Wear clips are typically made of steels or cobalt-chromium alloys and may be discarded or reused when disc wear exceeds allowable limits.

SUMMARY OF THE DISCLOSURE

A half cap wear clip is disclosed herein. The half cap wear clip may comprise: a wear face configured to interface with a torque bar; a first flange disposed on a first side of the wear face and a second flange disposed on a second side of the wear face, the second side opposite the first side; and a deformable feature disposed on a first end of the first flange and the second flange and the wear face, the deformable feature configured to permanently deform a first distance in response to a load on the wear face exceeding a load threshold.

In various embodiments, the deformable feature may comprise a first deformable leg disposed on the first side and extending from the first flange to the wear face. The deformable feature may comprise a second deformable leg disposed on the second side and extending from the second flange to the wear face. The half cap wear clip may further comprise a wear face leg defining the wear face, wherein a cavity is partially defined by the first flange, the second flange, the first deformable leg, the second deformable leg and the wear face leg. The deformable feature may be configured to permanently deform a second distance in response to a second load on the wear face exceeding the load threshold after the load threshold was exceeded a first time. The deformable feature may be configured to permanently deform a third distance in response to a third load on the wear face exceeding the load threshold after the load threshold was exceeded the first time and a second time, the third distance different from the second distance and the first distance, the second distance different from the first distance. The half cap wear clip may further comprise an aperture configured to receive a rivet.

A disc assembly is disclosed herein. The disc assembly may comprise: a plurality of lugs extending radially from an annular structure; and a plurality of half cap wear clips, each half cap wear clip coupled to a lug in the plurality of lugs and spaced apart circumferentially from an adjacent half cap wear clip coupled to an adjacent lug in the plurality of lugs, a wear face of each half cap wear clip being spaced apart from an adjacent wear face of the adjacent half cap wear clip defining a torque bar channel therebetween, each half cap wear clip in the plurality of half cap wear clips comprising a deformable feature configured to permanently deform a first distance in response to a load on the wear face exceeding a load threshold.

In various embodiments, each half cap wear clip in the plurality of half cap wear clips are riveted to the disc assembly. The deformable feature may comprise a first deformable leg disposed on a first side and extending from a first flange to the wear face. The deformable feature may comprise a second deformable leg disposed on a second side and extending from a second flange to the wear face. Each half cap wear clip may further comprise a wear face leg defining the wear face, wherein a cavity is partially defined by the first flange, the second flange, the first deformable leg, the second deformable leg and the wear face leg. The deformable feature may be configured to permanently deform a second variable distance in response to a second load on the wear face exceeding the load threshold after the load threshold was exceeded a first time. A load distribution between the plurality of half cap wear clips may be configured to change in response to one or more of the half cap wear clips in the plurality of half cap wear clips deforming.

A wheel and brake assembly is disclosed herein. The wheel and brake assembly may comprise: a wheel having a radially inner surface; a plurality of torque bars oriented parallel to an axis of rotation that are radially coupled to the radially inner surface of the wheel; and a rotor disc assembly comprising a plurality of half cap rotor clips, each torque bar in the plurality of torque bars disposed between a first wear face of a first half cap rotor clip and a second wear face of a second half cap rotor clip, wherein each half cap rotor clip in the plurality of half cap rotor clips is configured to permanently deform a first distance in response to a load on a wear face of the half cap rotor clip exceeding a load threshold.

In various embodiments, each half cap wear clip in the plurality of half cap rotor clips comprises a deformable feature. The deformable feature may include a first deformable leg spaced apart axially from a second deformable leg. The first deformable leg may extend circumferentially from a first flange of the half cap rotor clip to the wear face of the half cap rotor clip and the second deformable leg may extend circumferentially from a second flange of the half cap rotor clip to the wear face of the half cap rotor clip. A load distribution between the plurality of half cap rotor clips may be configured to change in response to one or more of the half cap rotor clips in the plurality of half cap rotor clips deforming the first distance. The half cap rotor clip may be configured to permanently deform a second variable distance in response to a second load on the wear face exceeding the load threshold after the load threshold was exceeded a first time.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

Figure 1:
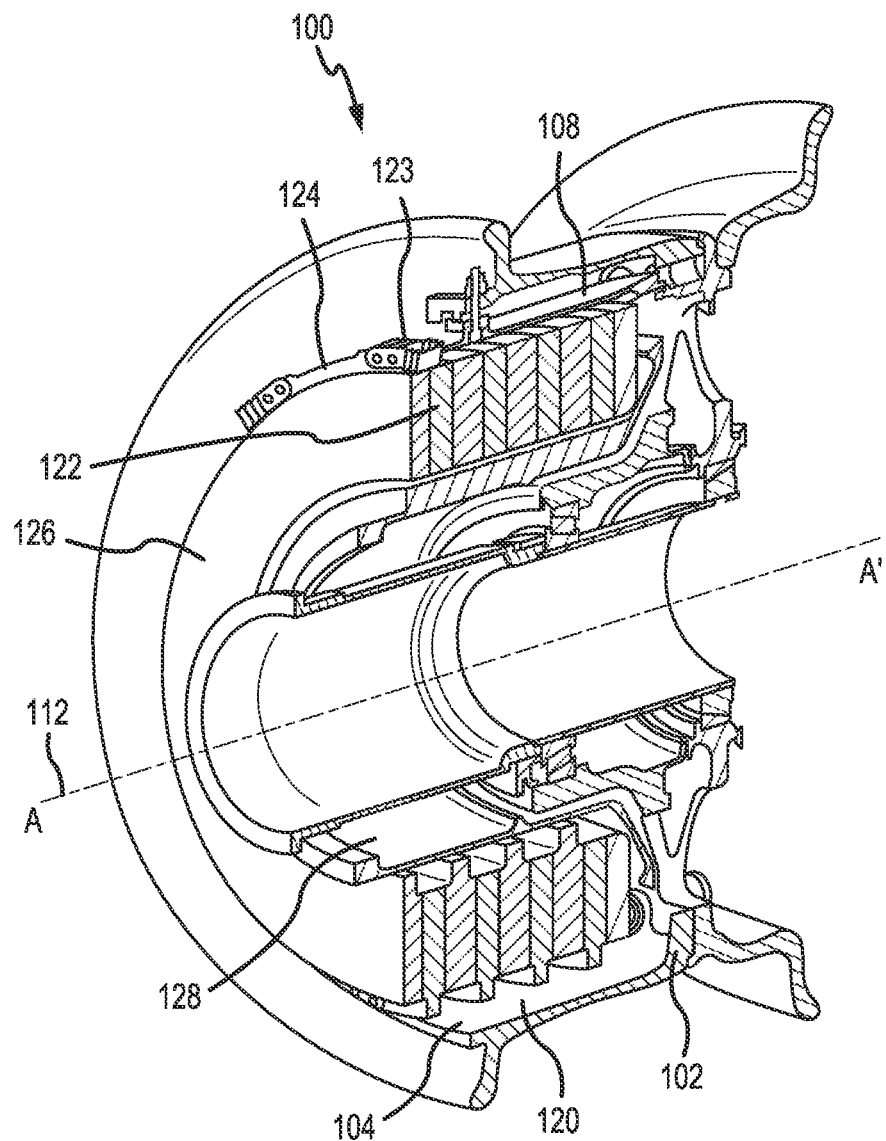
FIG. 1 illustrates a perspective view of portions of a wheel and brake assembly in accordance with various embodiments.

The detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods may find particular use in connection with rotor disc clips for aircraft brake systems. However, various aspects of the disclosed embodiments may be adapted for an optimized performance with a variety of components, including bushings and stator clips, and in a variety of systems. As such, numerous applications of the present disclosure may be realized.

Wear clips riveted to a rotor disc (cap clips or half cap clips) typically provide superior performance to floating rotor clips in every way except overload performance. Riveted rotor clips are lighter, less costly, reduce part count, and typically utilize less labor. Individual riveted rotor clips may have higher ultimate strength and do not cause carbon slot enlargement in service that impacts overhaul costs. However, in some cases, riveted rotor clips may not be practical due to regulated criteria for ultimate failure conditions that exceed the ultimate strength of an assembly of riveted rotor clips. That is, an assembly of riveted rotor clips may exhibit an ultimate strength that is less than the sum of the individual strengths of the riveted rotor clips.

Floating clips may be stronger as an assembly with a rotor disc relative to riveted rotor clips as an assembly with a rotor, despite the riveted rotor clips being stronger individually than the floating clips. In this regard, the floating clips can deform into the carbon disc in response to experiencing an excessive load. However, the riveted rotor clips are unable to deform in response to experiencing the same excessive load. Thus, a brittle type failure condition may exist for riveted rotor clips.

In various embodiments, disclosed herein are rotor clips with a deformable feature. The deformable feature may achieve a load-redistribution behavior and a ductile failure mode similar or superior to floating clips, thus enabling the use and benefits of riveted rotor clips disclosed herein for all carbon brake disc designs, in accordance with various embodiments.

Figure 2:
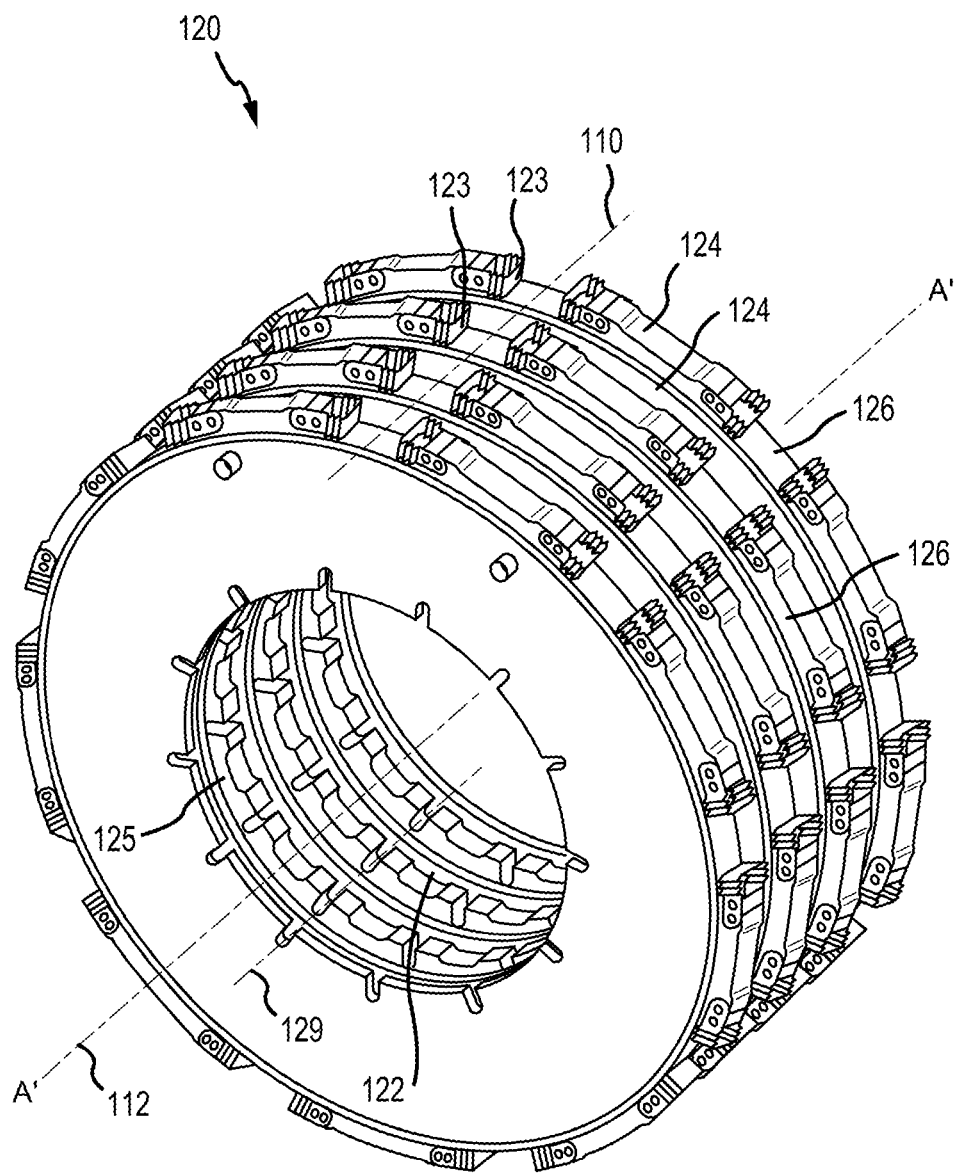
FIG. 2 illustrates a perspective view of a brake disc stack in accordance with various embodiments.

With reference to FIGS. 1 and 2, in accordance with various embodiments, a wheel and brake assembly 100 may comprise a wheel 102 having a radially inner surface 104. A plurality of torque bars 108 are oriented parallel to an axis of rotation 112 and are radially coupled to the radially inner surface 104 of wheel 102. A brake assembly is disposed within wheel 102. The brake assembly comprises a brake stack 120 oriented about axis of rotation 112. Brake stack 120 may comprise a plurality of alternating stators 126 and rotor discs 122.

In various embodiments, rotor disc 122 may comprise an annular structure 121. The rotor disc 122 may further comprise a plurality of rotor disc lugs 124 disposed on an outer diameter defined by the annular structure 121 of the rotor disc 122. When rotor discs 122 are similarly oriented about axis of rotation 112, they may define a plurality of torque bar channels 110. In various embodiments, torque bars 108 may be disposed in torque bar channels 110 and may be configured to engage with rotor discs 122 as wheel 102, torque bars 108, and rotor discs 122 rotate about axis of rotation 112.

In various embodiments, stators 126 may be stationary and may be coupled to torque plate 128. Torque plate 128 may comprise a plurality of splines on its outer diameter. In various embodiments, stator 126 may comprise a plurality of stator lugs 125 disposed on an inner diameter of stator 126. When stators 126 are similarly oriented about axis of rotation 112, they may define a plurality of torque plate spline channels 129. In various embodiments, splines may be disposed in torque plate spline channels 129 and may be configured to couple stators 126 to torque plate 128, thereby preventing rotation of stators 126.

In various embodiments, actuation of the brake assembly may cause the application of force to brake stack 120 in an axial direction—that is, from A to A' along axis of rotation 112—thereby causing compression of brake stack 120 along A to A'. In various embodiments, compression of brake stack 120 may slow the rotation of rotor discs 122, torque bars 108, and wheel 102.

In various embodiments, brake assembly 100 may further comprise a plurality of rotor clips 123. Rotor clips 123 may be coupled to rotor disc lugs 124. In various embodiments, rotor clips 123 may be disposed between rotor disc lugs 124 and torque bar 108 and/or between rotor disc 122 and torque bar 108. During compression of brake stack 120 and deceleration of rotor discs 122, torque bars 108, and wheel 102, high compression and torque loads may be transferred to and/or through rotor clips 123, causing wear. In various embodiments, rotor clips 123 may be subject to vibration and heat, causing wear. In various embodiments, rotor clips 123 may protect rotor discs 122 and rotor disc lugs 124 from excessive wear. In various embodiments, rotor clips 123 may be discarded or re-used when disc wear exceeds allowable limits.

In various embodiments, as defined further herein, the rotor clips 123 comprise a deformable feature designed and configured to yield at a predetermined load threshold. The deformable feature may be configured to yield multiple times at the predetermined threshold. For example, the deformable feature may deform a first variable distance in response to exceeding the predetermined threshold and the deformable feature may deform a second and multiple distances in response to exceeding the predetermined threshold a second or multiple times. Each deformation distance may be variable, in accordance with various embodiments. In various embodiments, the load threshold is independent of deformation distance or number of times load exceeds the threshold.

In various embodiments, the yielding of the deformable feature of the rotor clips may support brake torque regulatory requirements and protect torque bars 108.

Other components of brake assembly 100 may be discarded when disc wear exceeds allowable limits. In various embodiments, brake assembly 100 may comprise a plurality of stator clips. Stator clips may be disposed on stator lugs 125 and/or may couple stators 126 to torque plate 128. Stator clips may protect stator lugs 125, stators 126, and/or torque plate 128 from excessive wear.

In various embodiments, rotor clips and/or other sacrificial components may comprise a steel or cobalt-chromium alloy. In various embodiments, the cobalt-chromium alloy may comprise any combination of metals such as cobalt, nickel, iron, aluminum, boron, carbon, chromium, manganese, molybdenum, phosphorus, sulfur, silicon, and/or titanium. In various embodiments, rotor clips and/or other sacrificial components may comprise any suitable metal or metal alloy.

Figures 3A, 3B:
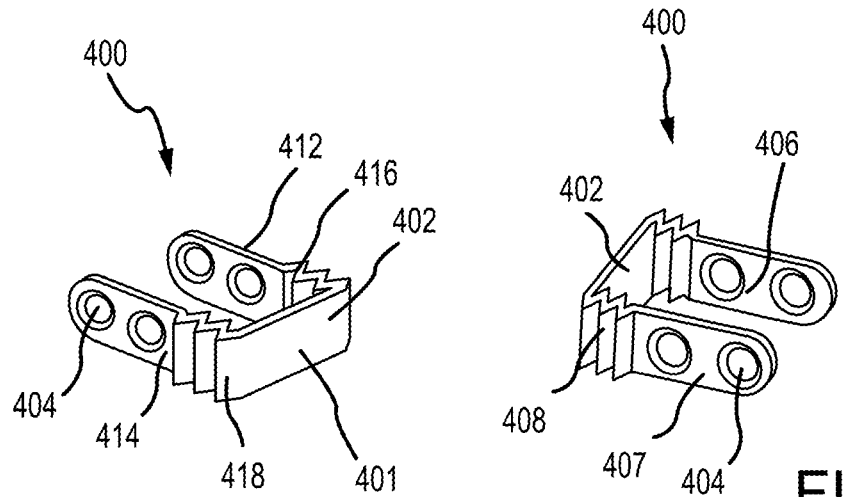
FIG. 3A illustrates perspective view of a rotor clip in accordance with various embodiments.
FIG. 3B illustrates a perspective view of a rotor clip in accordance with various embodiments.
Figure 4:
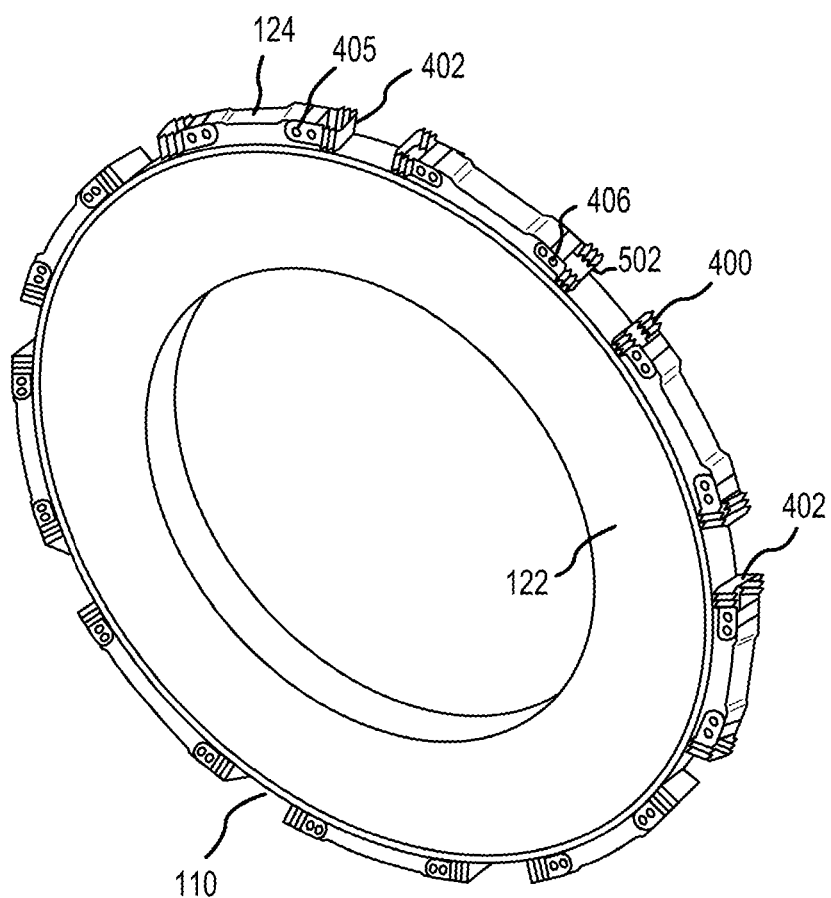
FIG. 4 illustrates a brake disc having a rotor clip, in accordance with various embodiments.

With reference to FIGS. 3A, 3B, and 4 a rotor clip may in accordance with various embodiments comprise a half cap rotor clip 400. In various embodiments, half cap rotor clip 400 may comprise a wear face 402. In various embodiments, wear face 402 may comprise a surface of half cap rotor clip 400 configured to be in physical contact with at least one of torque bar 108 (with momentary reference to FIGS. 1 and 2), rotor disc 122, and/or rotor disc lug 124.

In various embodiments, half cap rotor clip 400 may comprise at least one rivet aperture 404 and may be coupled to rotor disc 122 by at least one clip rivet 405. Clip rivet 405 may be disposed in rivet aperture 404. Rivet aperture 404 may be disposed in a surface of half cap rotor clip 400 such that clip rivet 405 is coupled to an axial face of rotor disc lug 124. In various embodiments, one or more half cap rotor clips 400 may be disposed on the circumferential ends of rotor disc lugs 124 and may extend a distance toward the radial median of rotor disc lugs 124.

In various embodiments, a first wear face of a half cap rotor clip 400 may be spaced apart circumferentially from a second wear face of an adjacent half cap rotor clip 400. In this regard, a circumferential space between the half cap rotor clip 400 and the adjacent half cap rotor clip 400 may be defined as a torque bar channel (e.g., torque bar channel 110 from FIG. 1). The torque bar channel may be configured to receive a torque bar 108 from FIG. 1 as described previously herein.

In various embodiments, the half cap rotor clip 400 comprises a deformable feature 408. The deformable feature 408 is configured to yield, reducing a distance between the wear face 402 and the main body portion 406 in response to a load on the wear face 402 exceeding a specific load threshold. In various embodiments, the deformable feature 408 deforms permanently in a controlled manner. In various embodiments, the deformable feature 408 is configured to facilitate load re-distribution during operation of wheel and brake assembly 100 from FIGS. 1 and 2. For example, due to tolerance differences, high circumferential or tangential loads may not be evenly distributed through half cap rotor clips 400. Thus, in response to one or more of the half cap rotor clips 400 in a plurality of the half cap rotor clips 400 of FIG. 4 exceeding the load threshold, the half cap rotor clip 400 will deform a variable distance and a load distribution between all the half cap rotor clips 400 may be re-distributed relative to prior to the deformation.

In various embodiments, the deformable feature 408 is disposed on a first side 412 and a second side 414 of the half cap rotor clip 400. The deformable feature 408 may include a first deformable leg 416 disposed on the first side 412 and a second deformable leg 418 disposed on the second side 414. The first deformable leg 416 extends from a first flange 406 to the wear face 402 on the first side 412 and the second deformable leg 418 extends from a second flange 407 to the wear face 402. The wear face 402 may be defined by a wear face leg 401 extending from an end of the first deformable leg 416 and the second deformable leg 418.

In various embodiments, the flanges 406, 407, the first deformable leg 416, the second deformable leg 418, and the wear face leg 401 at least partially define a cavity therebetween. In this regard, a volume of the cavity decreases in response to the deformable feature 408 deforming.

Figure 6:
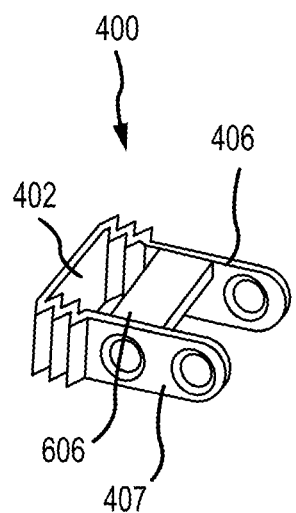
FIG. 6 illustrates perspective view of a rotor clip in accordance with various embodiments.

With brief reference to FIG. 6, the half cap rotor clip 400 may further comprise a plate 606 extending from the first flange 406 to the second flange 407 on a circumferential side of the half cap rotor clip. The plate 606 may facilitate re-use of the half cap rotor clip 400. In this regard, the plate 606 may provide greater structural capabilities for the half cap rotor clip 400 over time relative to a half cap rotor clip without the plate 606 as illustrated in FIGS. 3A and 3B.

Figure 5:
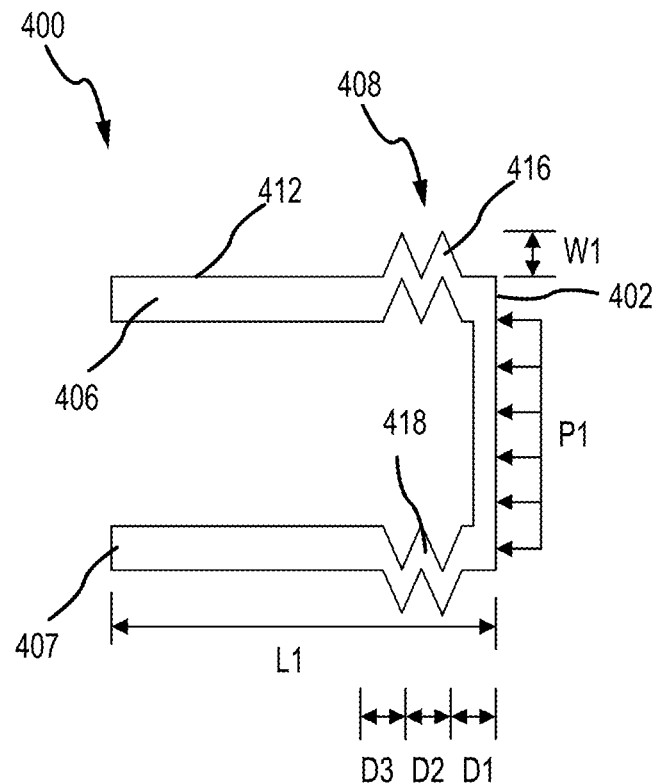
FIG. 5 illustrates a top down view of a rotor clip, in accordance with various embodiments.

Referring now to FIG. 5, a top down view of a half cap rotor clip 400 with the deformable feature 408 is illustrated, in accordance with various embodiments. In various embodiments, the first deformable leg 416 may include a peak that extends outward from the first side 412 of the first flange 406 a width W1. The width W1 may be less than or equal to a rivet head distance from the first axial side 412. Similarly, the second deformable leg 418 may include a peak that extends outward from second axial side by the width W1. In this regard, a minimum disc thickness may not be impacted by the half cap rotor clip 400, in accordance with various embodiments. In various embodiments, the width W1 may remain constant for each period of a peak and valley. In various embodiments, the peaks and valleys may be sinusoidal in shape, linear between peaks and valleys, or the like. In various embodiments, the first deformable leg 416 and the second deformable leg 418 may both comprise a constant amplitude. In this regard, a same load may result in deformation of a variable length regardless of prior deformation.

In various embodiments, the deformable feature 408 defines a deformable length L1. The deformable length L1 may be equal to or greater than a floating clip deformation prior to the floating clip becoming inoperable. In this regard, the deformable feature 408 may achieve a same or superior load-redistribution behavior and a ductile failure mode of floating clips, thus enabling the use and benefits of half cap rotor clips 400 for all brake disc designs, in accordance with various embodiments.

In various embodiments, the deformable length L1 may correspond to a plurality of deformable distances D1, D2, D3. The deformable length L1 may comprise a total deformable length prior to inoperability of the half cap rotor clip 400. In various embodiments, the deformable distances D1, D2, D3 are not equal. Although described herein as being variable, the present disclosure is not limited in this regard. For example, the deformable distance D1, D2, D3 may be equal in accordance with various embodiments.

In various embodiments, the deformable feature 408 is sized and configured to deform the first variable distance D1 in response to a load threshold P1 being exceeded. In this regard, the length between an end of the flanges 406, 407 and the wear face 402 may be reduced by the distance D1 to a new length (L1−D1) in a permanent manner until the pressure threshold P1 is exceeded again. Then, in response to the pressure threshold P1 being exceeded again, the deformable feature 408 is sized and configured to deform the second distance D2, reducing the length between the end of the flanges 406, 407 and the wear face 402 to a second new length (L1−D1−D2). Lastly, in response to the pressure threshold P1 being exceeded a third time, the deformable feature 408 may deform permanently the third distance D3, resulting in a third new length of approximately zero. Although illustrated as comprising three steps of deformation, the present disclosure is not limited in this regard. For example, any number of permanent deformations is within the scope of this disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A disc assembly, comprising:
   a plurality of lugs extending radially from an annular structure; and
   a plurality of half cap wear clips, each half cap wear clip coupled to a lug in the plurality of lugs and spaced apart circumferentially from an adjacent half cap wear clip coupled to an adjacent lug in the plurality of lugs, a wear face of each half cap wear clip being spaced apart from an adjacent wear face of the adjacent half cap wear clip defining a torque bar channel therebetween, each half cap wear clip in the plurality of half cap wear clips comprising a deformable feature configured to permanently deform a first distance in response to a load on the wear face exceeding a load threshold.

2. The disc assembly of claim 1, wherein each half cap wear clip in the plurality of half cap wear clips are riveted to the disc assembly.

3. The disc assembly of claim 1, wherein the deformable feature comprises a first deformable leg disposed on a first side and extending from a first flange to the wear face.

4. The disc assembly of claim 3, wherein the deformable feature comprises a second deformable leg disposed on a second side and extending from a second flange to the wear face.

5. The disc assembly of claim 4, wherein each half cap wear clip further comprises a wear face leg defining the wear face, wherein a cavity is partially defined by the first flange, the second flange, the first deformable leg, the second deformable leg and the wear face leg.

6. The disc assembly of claim 1, wherein the deformable feature is configured to permanently deform a second variable distance in response to a second load on the wear face exceeding the load threshold after the load threshold was exceeded a first time.

7. The disc assembly of claim 1, wherein a load distribution between the plurality of half cap wear clips is configured to change in response to one or more of the half cap wear clips in the plurality of half cap wear clips deforming.

8. A wheel and brake assembly, comprising:
   a wheel having a radially inner surface;
   a plurality of torque bars oriented parallel to an axis of rotation that are radially coupled to the radially inner surface of the wheel; and
   a rotor disc assembly comprising a plurality of half cap rotor clips, each torque bar in the plurality of torque bars disposed between a first wear face of a first half cap rotor clip and a second wear face of a second half cap rotor clip, wherein each half cap rotor clip in the plurality of half cap rotor clips is configured to permanently deform a first distance in response to a load on a wear face of the half cap rotor clip exceeding a load threshold.

9. The wheel and brake assembly of claim 8, wherein each half cap wear clip in the plurality of half cap rotor clips comprises a deformable feature.

10. The wheel and brake assembly of claim 9, wherein the deformable feature includes a first deformable leg spaced apart axially from a second deformable leg.

11. The wheel and brake assembly of claim 10, wherein the first deformable leg extends circumferentially from a first flange of the half cap rotor clip to the wear face of the half cap rotor clip and the second deformable leg extends circumferentially from a second flange of the half cap rotor clip to the wear face of the half cap rotor clip.

12. The wheel and brake assembly of claim 8, wherein a load distribution between the plurality of half cap rotor clips is configured to change in response to one or more of the half cap rotor clips in the plurality of half cap rotor clips deforming the first distance.

13. The wheel and brake assembly of claim 8, wherein the half cap rotor clip is configured to permanently deform a second variable distance in response to a second load on the wear face exceeding the load threshold after the load threshold was exceeded a first time.

* * * * *